UNITED STATES PATENT OFFICE.

HIRAM F. SNOW AND JAMES H. DAVIS, OF DOVER, NEW HAMPSHIRE.

IMPROVED COMPOSITION FOR PAVEMENTS.

Specification forming part of Letters Patent No. 96,988, dated November 16, 1869.

*To all whom it may concern:*

Be it known that we, HIRAM F. SNOW and JAMES H. DAVIS, of Dover, in the county of Strafford and State of New Hampshire, have invented a new and useful or improved composition to be used for the making of pavements, as well as for other purposes in the arts; and we do hereby declare the same to be described as follows:

The constituents of the composition, and the proportions thereof, may be stated as follows: Fifteen bushels of sand or fine gravel; three bushels of wood sawdust; forty gallons of coal-tar, (it being preferable to have tar in a heated state;) one quart of sulphuric acid.

To the above constituents there may be also added about ten pounds of rosin or resin.

The sand, sawdust, coal-tar, and sulphuric acid are to be well mixed together to form the composition. The addition of the resin improves the compound for certain purposes.

We do not confine our invention to the precise proportions of the ingredients as stated, as they may be varied more or less, as circumstances may require; but we have found the proportions as above cited to be productive of good results.

In our Patent No. 81,698 we claimed a composition consisting of wood sawdust, gravel or mineral matters, sulphuric acid, and the residuum obtained from coal-tar by distilling therefrom the water and naphtha. A distinctive difference between the subject of such patent and our present invention is, that we do not make use of the tarry residuum, but use the coal-tar without subjecting it to the process of distillation.

We do not remove from the tar its water and naphtha, and therefore use it practically in its normal state; and we have discovered that when it is in such a condition the addition to it of the sulphuric acid produces very different effects or results from what follow from the addition to it of any other acid—as oxalic acid, for instance; that is to say, we have found that the sulphuric acid will operate to deodorize the coal-tar, or remove from it the offensive smell resulting from the naphtha or other matters contained in the tar. The acid also hardens or thickens the tar, or overcomes much of its unnecessary adhesive properties, thus preventing the composition, when in use as a pavement, from sticking to the shoes of persons or to carriage-wheels.

The sulphuric acid, when mixed with the coal-tar, raises its temperature, and thereby facilitates the admixture or connection of it with the other ingredients. It also serves to neutralize a dead-oil or substance in the coal-tar which, were the coal-tar not treated with the acid, would, after exposure to the air, dry away or pass off, and leave the composition brittle and easily crumbled.

The tarry residuum is more expensive than the coal-tar, and, besides, is too hard for some purposes.

The sulphuric acid seems to dissolve more or less of, or so operates on the sand as to cause it to mix to better advantage with the tar; it also chars and colors the wood sawdust to advantage.

The water and the naphtha, being left in the tar, aid in rendering the composition more plastic, and enable more of the sawdust and mineral matters to be used, and thus increase the amount of composition that can be made with a given weight of tar.

The resin we use to temper the mixture and increase its tenacity, and to benefit it in other respects.

We do not herein claim the employment of sulphuric acid with the tarry residuum above mentioned, or with the same and sand, or with sawdust; nor do we claim the employment of oxalic acid with coal-tar. Nor do we claim the use of sulphuric acid with common wood-tar in the making of compositions for covering the bottoms of vessels, wood-tar being too hard and thick for our purposes, and, besides, the wood-tar is not affected by the acid as is coal-tar, they being two different substances. The purpose of our invention is to utilize the coal-tar in the making of a pavement composition, to deprive it of its nauseous and objectionable odor, (not incident to wood-tar,) to thicken and harden it, and to save the necessity of first evaporating from it those matters which impart to it its peculiar nauseous odor, and make them useful auxiliaries or parts of the composition.

The sulphuric acid advantageously affects the resin when mixed with coal-tar and used with the sawdust and sand, as set forth.

We claim therefore—

1. The employment of sulphuric acid with coal-tar, when used with sawdust and sand or gravel, or a mineral matter, in the formation of a composition, as set forth.

2. The employment of sulphuric acid with coal-tar and resin, when used with sawdust and sand or gravel, or a mineral substitute therefor, in the making of a composition, for the purpose as specified.

HIRAM F. SNOW.
JAMES H. DAVIS.

Witnesses:
JOSHUA G. HALL,
CHARLES H. JENNESS.